United States Patent Office 2,908,735
Patented Oct. 13, 1959

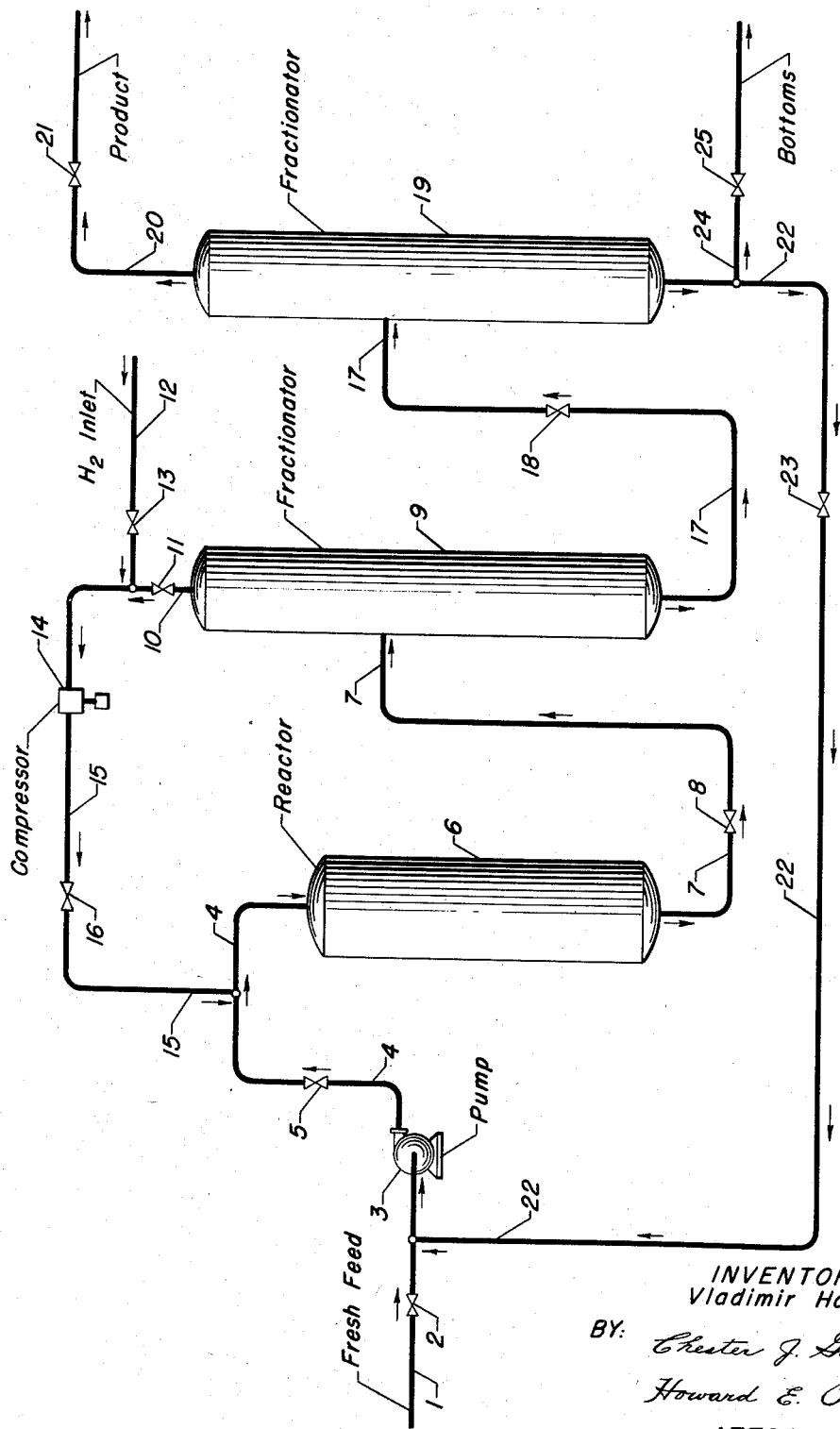

2,908,735

ISOMERIZATION OF NORMAL BUTANE

Vladimir Haensel, Hinsdale, Ill., assignor, by mesne assignments, to Universal Oil Products Company, Des Plaines, Ill., a corporation of Delaware Application January 11, 1956, Serial No. 558,502

4 Claims. (Cl. 260—683.68)

This application is a continuation-in-part of my copending application Serial No. 325,460 filed December 11, 1952, now abandoned, which in turn is a continuation-in-part of my now abandoned copending application, Serial No. 198,296, filed November 30, 1950, as a continuation-in-part of Serial No. 41,671, filed July 30, 1948, now abandoned.

This invention relates to the isomerization of normal butane and is more particularly concerned with a novel catalytic composition which is utilized to effect the desired isomerization.

In recent years with the advance of the automotive industry and the aviation industry, fuels of relatively high antiknock rating have been found necessary. Many methods have been provided for producing the desired high antiknock fuels. These methods include such processes as alkylation, catalytic reforming, catalytic cracking, and high temperature thermal cracking and thermal reforming operations. Other processes which may be considered in a sense auxiliary were developed as, for example, isomerization which was employed to produce isoparaffins which subsequently were reacted with olefins to form a high octane number motor fuel fraction, commonly termed alkylate. In addition to the production of one of the reactants for alkylation, isomerization was also utilized to increase the antiknock quality of saturated hydrocarbons such as paraffins and naphthenes found in selected fractions of gasolines and naphthas. This invention is specifically concerned with the isomerizing of normal butane to provide isobutane. The isobutane product of this invention may be utilized for various purposes, including alkylation reactions. The preferred alkylation reaction comprises combining isobutane with ethylene, propylene, butylenes, etc. to produce a mixture of higher isoparaffinic hydrocarbons boiling within the gasoline range and having a high octane number.

In most isomerization processes, catalytic agents are employed to effect the desired molecular rearrangement. Ordinarily, these catalytic agents consist of metal halides such as aluminum chloride, aluminum bromide, etc., which are activated by the addition of the corresponding hydrogen halide. These catalytic materials are very active and effect very high conversions per pass. However, this high activity is disadvantageous in some respects. One of the greatest disadvantages is the fact that these catalytic materials not only accelerae the isomerization reaction, but also induce decomposition reactions. The latter are particularly detrimental to the economics of the operation in that they cause the loss of an appreciable portion of the charging stock as well as considerably increased catalyst consumption by the reaction of fragmental material with the catalytic agent to form sludge-like materials. I have discovered a catalytic agent which can be effectively employed for the isomerization of normal butane without the attending decomposition reactions. My catalytic agent consists of an association of a small amount of platinum with one or more refractory oxides such as, alumina, zirconia, magnesia, etc., and mixtures thereof. My catalytic agent also includes a small amount of a halogen such as fluorine, chlorine, bromine and/or iodine.

In one embodiment my invention relates to a process for isomerizing an isomerizable organic compound which comprises subjecting said compound to contact at isomerizing conditions with a catalyst comprising alumina, platinum, and combined halogen.

In a specific embodiment my invention relates to a process for isomerizing normal butane, which comprises subjecting normal butane to contact at isomerizing conditions with a catalyst comprising alumina, platinum, and combined halogen.

In a further embodiment, my invention relates to a process for isomerizing normal butane which comprises subjecting normal butane at a temperature of from about 400° F. to about 950° F. and a pressure of from about 15 to about 1500 lbs. per square inch to the action of a catalyst comprising a major portion of alumina, from about 0.01% to about 1% by weight of platinum and from about 0.1% to about 10% by weight of combined halogen.

In a more specific embodiment, my invention relates to a process for isomerizing normal butane, which comprises subjecting normal butane at a temperature of from about 400° F. to about 950° F. and a pressure of from about 15 to about 1500 lbs. per square inch to the action of a catalyst prepared by forming a mixture of alumina and halogen ions, the halogen ions being in an amount of from about 0.1% to about 10% by weight of said alumina on a dry basis, thereafter compositing platinum with the mixture, and subsequently heating the composite.

While the process of my invention is applicable to the isomerization of isomerizable organic compounds, including paraffins containing 5 to 12 or more carbon atoms per molecule, for example normal pentane, normal hexane, etc., cycloparaffins, aromatics, organic acids, alcohols, ethers, and the like, it is more particularly applicable to the isomerization of normal butane.

The charge stock to my process should be a normally gaseous charge stock which is predominantly normal butane. It is preferred that normal butane be present in amounts of at least 75% by weight of the charge stock and still more preferable in amounts of at least 90% by weight. The best charge stock is substantially pure normal butane.

The process of my invention may be carried out by employing a fixed bed of catalytic material disposed within the reaction zone, through which the hydrocarbons in admixture with hydrogen, if desired, are passed, and the reaction products then introduced into suitable fractionation equipment wherein the desired products are separated.

Alternatively, the reaction may be conducted by employing a finely divided catalyst material disposed in a confined reaction zone through which the vaporous charge is passed at a rate sufficient to effect the fluidization of the finely divided catalyst material so that the charge contacts the catalyst in a relatively dense bed of rapidly moving particles and is thereafter separated from entrained catalyst and passed through the desired fractionation system as above. This latter method is particularly adaptable to this operation since the isomerization reaction is mildly exothermic. The catalyst can be withdrawn from the reaction zone, cooled, and returned to the zone to regulate the reaction temperature at a substantially constant level.

Still another modification consists of employing a catalytic material in the form of a relatively compact bed which is passed downwardly from the reaction zone and is contacted with a charge in the vapor state either concurrently or countercurrently.

The isomerization reaction may be conducted at temperatures within the range of from about 400 to about 950° F. under a pressure of from about 15 to 1500 lbs. per square inch and a space velocity, measured as volumes of liquid charge per volume of catalyst per hour, of from about 0.1 to about 20 or more.

The catalyst for use in my process comprises a refractory metal oxide containing minor amounts of combined halogen and platinum. A preferred type of catalyst comprises platinum-alumina-combined halogen catalyst of the type desscribed in my U.S. Patent No. 2,479,109, issued August 16, 1949. These catalysts may contain substantial amounts of platinum, but, for economic as well as for product yield and quality reasons, the platinum content usually will be within the range of from about 0.01% to about 1% by weight. These catalysts also contain a relatively minor amount of a halogen, especially fluorine or chlorine. On a dry alumina basis, the halogen content usually will be within the range of from about 0.1% to about 10% by weight. Since fluorine generally is more active than chlorine, the amount of fluorine incorporated in the catalyst usually will be somewhat less than the amount of chlorine necessary to give a desired activity. The precise manner in which the halogen is present in the catalyst is not known, but it is believed to be combined with one or more of the constituents. Consequently, it is often referred to as combined halogen.

One method of preparing catalyst useful in my process comprises adding a suitable alkaline reagent such as ammonium hydroxide, or carbonate to a salt of aluminum such as aluminum chloride, aluminum sulphate, aluminum nitrate, etc., in an amount sufficient to form aluminum hydroxide which upon drying is converted to alumina. The halogen may be added to the resultant slurry in the form of an acid such as hydrogen fluoride, hydrogen chloride, etc., or as a volatile salt, such as ammonium fluoride, ammonium chloride, etc. Platinum, or one of the other metals of the platinum group, may be added to the alumina by adding hydrogen sulfide to a solution of a platinum compound commingling the resulting solution with the halogen-containing alumina, and thereafter heating the resultant composite to a temperature of from about 800 to about 1200° F.

I ordinarily prefer to employ hydrogen in my process in order to restrict the amount of carbonaceous material deposited upon the catalyst, and to thereby prolong the life of the catalyst. The hydrogen: hydrocarbon ratios that I normally prefer to employ range from about 0.5 to about 10.

The following is a brief description of one method of conducting the operation employing a fixed bed of catalytic material.

Referring to the drawing the normal butane feed is introduced to line 1, containing valve 2, and is passed into pump 3, which discharges through line 4, valve 5, and into reactor 6. The catalyst disposed within reactor 6 may be of finely divided shape such as granules, spheres, or other shapes formed by extrusion pelleting, etc. The catalytic agent, as hereinbefore stated, is a multiple component material, but in every instance must contain the following three components:

(1) Refractory metal oxide
(2) Platinum
(3) Combined halogen

The operating conditions maintained in reactor 6 will comprise a temperature within the range of from about 400° F. to about 950° F. a pressure within the range of from slightly superatmospheric to about 1500 lbs. per square inch, and a space velocity within the range of from about 0.1 to about 20. The particular conditions selected for any operation will be dependent upon the specific catalyst employed, the charging stock utilized and the extent of conversion desired. In the modification shown in the attached drawing, hydrogen is introduced into the reaction zone along with the normal butane. This hydrogen is introduced into the system as needed through line 12 containing valve 13 and is passed through line 10 on the suction side of compresser 14 which discharges through line 15 containing valve 16 into line 4 through which it is directed into reactor 6.

Reaction products consisting of isobutane, normal butane, and hydrogen are withdrawn from reactor 6, through line 7, containing valve 8, and are directed into fractionator 9, wherein the hydrogen is separated from the higher boiling constitutents and recycled to the reactor through line 10 as previously described. In many cases it has been found that fractionator 9 can be dispensed with and a simple separator employed when the reactor effluent passing through line 7 is cooled to condense the normally liquid hydrocarbons. In such a case, the hydrogen separates as a gas from the liquid hydrocarbons and may be recycled as hereinbefore described. The hydrogen-free material is withdrawn from the bottom of fractionator 9 through line 17 containing valve 18 and is passed into fractionator 19 wherein the desired product is separated from the unconverted material and the recovered overhead through line 20 containing valve 21. The unconverted material is withdrawn through line 22 containing valve 23 and is recycled to line 1 from whence it passes into reactor 6. In order to avoid a build-up of degradation products in the system, a bleed line has been provided on the bottom withdrawal of fractionator 19 from which a minor proportion of the bottoms can be withdrawn from the system through line 24 containing valve 25 into suitable fractionation equipment (not shown in the drawing) in which the unconverted charge is separated to be returned to the reactor.

The following examples are given to illustrate my invention but are not introduced with the purpose of unduly limiting the same.

EXAMPLE I

The following results were obtained upon reacting normal butane in the presence of hydrogen, at a hydrogen to hydrocarbon mole ratio of 6 to 1 and an hourly liquid space velocity of 2, using a platinum-alumina-fluorine catalyst. The pressure was varied from 100 lbs. per square inch to 700 lbs. per square inch. The conditions and results are given below in Table I.

Table I

| Run Number | 1 | 2 | 3 | 4 | 5 |
| --- | --- | --- | --- | --- | --- |
| Cat. Temp., degrees F | 896 | 932 | 932 | 932 | 932 |
| Pressure, P.s.i.g | 700 | 700 | 500 | 300 | 100 |
| Mol percent iso $C_4$ in total $C_4$ | 21.1 | 31.4 | 30.3 | 31.0 | 30.4 |

A small amount of the charge is lost to gas as methane, ethane, and propane. The isomerization reaction is, however, the predominating reaction at all operating pressures.

The above data in Table I indicates the exceptional activity of the catalyst in the isomerization of paraffinic hydrocarbons.

EXAMPLE II

Several catalysts were tested to compare the activity of the various components for the isomerization of normal butane. The charge stock used was 98.6% by weight pure normal butane, 0.7% isobutane, 0.1% propane, 0.2% ethane and 0.1% methane. The normal butane was reacted in the presence of hydrogen at a hydrogen to hydrocarbon mol ratio of 1 to 1 and a liquid hourly space velocity of 10. The catalyst temperature was 851° F. and the total pressure 300 lbs. per square inch gauge. The catalysts used were alumina with platinum and/or chlorine. The catalyst compositions and results are given below in Table II.

Table II

| Catalyst | A | B | C |
|---|---|---|---|
| Wt. Percent Platinum | 0.375 | 0 | 0.375 |
| Wt. Percent Chlorine | 0.06 | 1.16 | 1.25 |
| Wt. Percent isobutane produced | 0.0 | 0.0 | 9.5 |

The above data clearly illustrate the unexpectedly high activity of an alumina-platinum-halogen catalyst for isomerization of normal butane. Platinum and alumina has no detectable isomerization activity and an alumina-chlorine catalyst has no detectable isomerization activity for normal butane. Adding the amounts of catalytic components, that is adding the amounts of catalytic components in columns A and B, it might be expected that a catalyst containing 0.375% by weight of platinum and 1.22% (0.06%+1.16%) by weight of chlorine would produce 0.0% by weight of isobutane. However, 9.5% by weight is produced. This clearly illustrates the unexpected high selectivity of the particular catalyst for the process of isomerizing normal butane.

EXAMPLE III

A straight-run naphtha having an initial boiling point of 189° F. and an end point of 388° F. was blended with normal butane and the blend contained 15%, normal butane by weight. This blend was reformed in the presence of a catalyst containing alumina, 0.3% by weight of platinum and 0.5% by weight of fluorine. The reaction was conducted at 700 lbs. per square inch pressure, a 3.0 hourly liquid space velocity, 932° F. temperature, and in the presence of hydrogen at a hydrogen to hydrocarbon mol ratio of 7 to 1. At these conditions the hourly liquid space velocity for the normal butane only was approximately 0.5. Only 2.7% of the normal butane was isomerized to isobutane at these conditions.

Norman butane of 98.6% purity by weight was then reacted at these same conditions, except a space velocity of 2.0 was employed. At these conditions 21% of the normal butane was converted to isobutane. Therefore, even though the space velocity in respect to normal butane was higher (2.0) than in the runs where the normal butane was blended with the naphtha (0.5) the conversion was much higher, in this case 21% compared to 2.7%. This example establishes that the conversion of normal butane to isobutane in the presence of an alumina-platinum-halogen catalyst is unexpectedly high when a substantially pure normal butane charge stock is used.

I claim as my invention:

1. A process for the production of isobutane from a substantially pure normal butane charge which comprises subjecting said charge at an isomerizing temperature up to about 950° F. and a pressure from about 15 to 1500 lbs. per square inch to the action of a catalyst comprising a major portion of refractory metal oxide, from about 0.01% to about 1% by weight of platinum and from about 0.1% to about 10% by weight of combined halogen.

2. A process for the production of isobutane from a substantially pure normal butane charge which comprises subjecting said charge at an isomerizing temperature up to about 950° F. and a pressure from about 15 to 1500 lbs. per square inch to the action of a catalyst comprising a major proportion of alumina, from about 0.01% to about 1% by weight of platinum and from about 0.1% to about 10% by weight of combined halogen selected from the group consisting of combined fluorine and combined chlorine.

3. A process for the production of isobutane from a substantially pure normal butane charge which comprises subjecting said charge at a temperature of from about 400° to about 950° F., and a pressure from about 15 to 1500 lbs. per square inch to the action of a catalyst comprising a major portion of refractory metal oxide, from about 0.01% to about 1% by weight of platinum and from about 0.1% to about 10% by weight of combined halogen.

4. A process for the production of isobutane from a substantially pure normal butane charge which comprises subjecting said charge at a temperature of from about 400° to about 950° F. and a pressure of from about 15 to 1500 lbs. per square inch to the action of a catalyst comprising of a major proportion of alumina, from about 0.01% to about 1% by weight of platinum, and from about 0.1% to about 10% by weight of combined halogen selected from the group consisting of combined fluorine and combined chlorine.

References Cited in the file of this patent

UNITED STATES PATENTS

| | | |
|---|---|---|
| 2,324,762 | Calhoun et al. | July 20, 1943 |
| 2,381,562 | Stewart | Aug. 7, 1945 |
| 2,406,869 | Upham | Sept. 3, 1946 |
| 2,479,110 | Haensel | Aug. 16, 1949 |
| 2,602,772 | Haensel | July 8, 1952 |
| 2,708,187 | Kearby | May 10, 1955 |

OTHER REFERENCES

Egloff et al.: "Isomerization of Pure Hydrocarbons" (1942), pages 106, 302 and 238.

Sachanen: "Chemical Constituents of Petroleum" (1945), page 210.